M. DAVISON.
SMOOTHING DRAG.
APPLICATION FILED FEB. 4, 1913.

1,061,990.

Patented May 20, 1913.

WITNESSES:

INVENTOR
Morgan Davison
BY
Hardway Cathey
ATTORNEYS

COLUMBIA PLANOGRAPH CO., WASHINGTON, D. C.

UNITED STATES PATENT OFFICE.

MORGAN DAVISON, OF ALMEDA, TEXAS.

SMOOTHING-DRAG.

1,061,990.　　　　　Specification of Letters Patent.　　Patented May 20, 1913.

Application filed February 4, 1913. Serial No. 746,247.

*To all whom it may concern:*

Be it known that I, MORGAN DAVISON, a citizen of the United States, residing at Almeda, in the county of Harris and State of Texas, have invented certain new and useful Improvements in Smoothing-Drags, of which the following is a specification.

This invention relates to new and useful improvements in a smoothing drag.

The object of the invention is to provide a drag of the character described designed to be used for the purpose of smoothing the ground between the rows of cotton or other growing plants, and for filling up the cracks and fissures in the ground, and also for throwing fresh earth up around the plants.

In dry climates the ground often cracks, leaving fissures through which the moisture from under the ground escapes, and by reason thereof the soil around the roots of the growing plants becomes very dry. If the fissures are filled this escape of moisture is prevented, and the subsoil, in which the roots of the plants are embedded will retain its moisture for a much longer time, even in case of extremely dry weather, and the roots of the plants will thus be supplied with moisture for a much longer period of time. It is one of the objects of this invention to fill these fissures with the result above indicated. The device may also be utilized for destroying boll weevil and other similar pests which infect cotton and such plants, inasmuch as in cultivating the plants with this implement the weevil are shaken from the plants and fall between the rows and are crushed and covered up by the implement passing thereover.

With the above and other objects in view the invention has particular relation to certain novel features of construction, operation and arrangement of parts, an example of which is given in this specification and illustrated in the accompanying drawing, wherein:—

Figure 1:
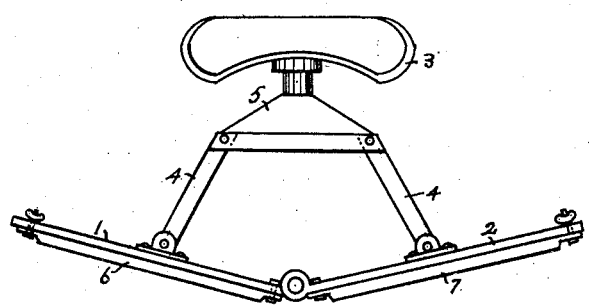
Figure 2:
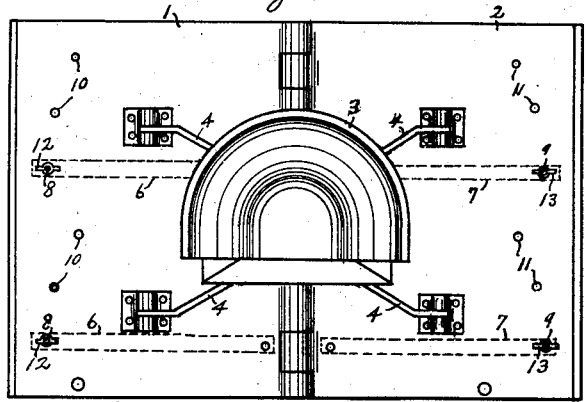
Figure 3:
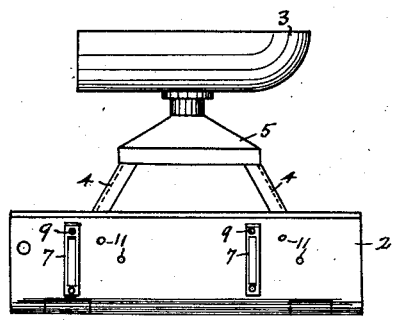

Figure 1 is a front elevation of the device. Fig. 2 is a plan view thereof and Fig. 3 is a side elevation thereof.

Referring now more particularly to the drawings wherein like numerals of reference designate similar parts in each of the figures, the numerals 1 and 2 refer to the runners of the drag, which are flat boards of wood or plates of metal, and which are hinged together at their inner edges, leaving the outer edges free, so that the drag may readily accommodate itself to the surface of the ground between the rows.

The numeral 3 designates the seat of the implement, which is mounted upon four legs indicated by the numeral 4. These legs are pivoted at their upper ends to the base 5 of the seat 3, and the lower ends of the legs on one side are pivoted to the runner 1, and on the other side are pivoted to the runner 2, as shown in Figs. 1 and 2. The driver occupies the seat 3 when the implement is in use, and his weight holds the implement firmly down upon the ground surface and gives the same sufficient weight to cause it to accomplish the desired result. The under side of the runner 1 has a plurality of cross bars 6, 6, and likewise the under side of the runner 2 has a plurality of cross bars 7, 7. The inner ends of these cross bars are pivoted to their respective runners, near their inner edges, and the outer ends thereof may be adjusted so that the cross bars will have the desired angle relative to the line of travel of the implement. The adjustment of the cross bars is accomplished by means of suitable bolts 8, 8 and 9, 9, which pass through orifices in the outer ends of said respective bars, and through corresponding orifices 10, 10 and 11, 11, near the outer edges of the respective plates, and which are held in their position by means of nuts 12, 12 and 13, 13. A plurality of orifices 10, 10 and 11, 11 are provided, and are arranged in an arcuate position relative to the points around which the inner ends of the cross bars 6, 6 and 7, 7 are swung, so that the angle of said cross bars may be varied at will, relative to the line of travel of the implement. These cross bars may extend at right angles to said line of travel, as shown in Figs. 1 and 2, in which case the implement will entirely smooth over the ground, and break up and loosen the surface thereof, and fill the fissures therein, but it is obvious that the angle may be changed, so that the loose earth may be thrown by the bars up around the roots of the plants. All of the boll weevil falling from the growing plants will be crushed or covered up by the implement as it passes over the ground and thereby destroyed.

The implement is pulled along between the rows by a horse or other suitable draft animal, in the manner of the ordinary harrow.

I have shown only one form of this device, but it is obvious that the mechanical construction thereof may be varied, and I hereby reserve the right to make any changes in the mechanical construction thereof which do not depart from the scope of the appended claims.

What I claim is:—

1. A device of the character described, including a plurality of flat runners hinged together along their adjacent edges, and having their outer edges free, a transverse cross bar on the under side of each of said runners, the inner ends of said cross bars being pivoted to the runners, and the outer ends thereof being adjustably secured thereto.

2. A device of the character described consisting of two flat runners hinged together along their adjacent edges, and having their outer edges free, a plurality of transverse cross bars carried by the under side of each runner, the inner ends of said cross bars being pivoted to their respective runners and the outer ends of said cross bars being adjustably secured thereto.

3. A device of the character described consisting of two flat runners hinged together along their adjacent edges, and having their outer edges free, a plurality of transverse cross bars carried by the under side of each runner, the inner ends of said cross bars being pivoted to their respective runners and the outer ends of said cross bars being adjustably secured thereto, a seat for said device, and a plurality of legs pivoted at one end to said seat, and at the other ends to the respective runners.

In testimony whereof I have signed my name to this specification in the presence of two subscribing witnesses.

MORGAN DAVISON.

Witnesses:
J. W. YEAGLEY,
T. J. HARRIS.

Copies of this patent may be obtained for five cents each, by addressing the "Commissioner of Patents, Washington, D. C."